United States Patent
Dickson et al.

(10) Patent No.: US 9,442,207 B1
(45) Date of Patent: Sep. 13, 2016

(54) SYSTEM AND METHOD FOR COMPUTING RESIDUAL MOVEOUT FROM SEISMIC IMAGES

(71) Applicants: Loralee Faye Dickson, Houston, TX (US); Yonghe J. Sun, Cypress, TX (US); Leonard Lin Zhang, Sugar Land, TX (US); Jingru Chen, Katy, TX (US)

(72) Inventors: Loralee Faye Dickson, Houston, TX (US); Yonghe J. Sun, Cypress, TX (US); Leonard Lin Zhang, Sugar Land, TX (US); Jingru Chen, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/738,388

(22) Filed: Jun. 12, 2015

(51) Int. Cl.
*G06K 9/00* (2006.01)
*G01V 1/34* (2006.01)
*G06T 7/20* (2006.01)
*G06T 5/00* (2006.01)
*G06T 3/00* (2006.01)
*G06T 5/20* (2006.01)

(52) U.S. Cl.
CPC ............ *G01V 1/345* (2013.01); *G06T 3/0093* (2013.01); *G06T 5/002* (2013.01); *G06T 5/20* (2013.01); *G06T 7/2046* (2013.01); *G01V 2210/324* (2013.01); *G01V 2210/52* (2013.01); *G01V 2210/6222* (2013.01); *G01V 2210/66* (2013.01); *G01V 2210/74* (2013.01); *G06T 2207/20024* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 5,570,321 A | * | 10/1996 | Bernitsas | G01V 1/282 367/38 |
| 2002/0049540 A1 | * | 4/2002 | Bevc | G01V 1/303 702/2 |
| 2010/0104191 A1 | * | 4/2010 | McGwire | G06K 9/0063 382/190 |
| 2010/0135115 A1 | * | 6/2010 | Sun | G01V 1/303 367/75 |
| 2012/0218861 A1 | * | 8/2012 | Xia | G01V 1/303 367/73 |
| 2012/0241166 A1 | * | 9/2012 | Sun | G01V 1/30 166/369 |
| 2015/0117144 A1 | * | 4/2015 | Sun | G01V 1/303 367/7 |
| 2016/0109592 A1 | * | 4/2016 | Sun | G01V 1/368 367/46 |

FOREIGN PATENT DOCUMENTS

WO WO2013009944 1/2013

OTHER PUBLICATIONS

Hale addresses ("Dynamic warping of seismic images", 2013).*
Francesco Perrone, et.al., "Linearized wave-equation migration velocity analysts by image warping", Geophysics, vol. 79, No. 2, Mar.-Apr. 2014, pp. S35-S46.
Gabriel Perez, et al. "Fine tuning your seismic image: prestack data warping to improve stack quality and resolution" SEG/New Orleans 2006 Annual Meeting, pp. 2475-2479.
Francesco Perrone, et.al., "Wavefield tomography using image-warping", Doctoral Thesis, Colorado School of Mines, Golden Colorado, Oct. 16, 2013, pp. 1-174.
Grandi, et al., "Quantitative 4D Warping Inversion", Intl. Petroleum Technology Conference, Doha, Qatar, Dec. 2009, pp. 1-8.
Dave Hale, "Dynamic warping of seismic images", Geophysics, vol. 78, No. 2, Mar.-Apr. 2013, pp. S105-S115.

* cited by examiner

*Primary Examiner* — Avinash Yentrapati
(74) *Attorney, Agent, or Firm* — Marie L. Clapp

(57) ABSTRACT

A method is described for residual moveout analysis using dynamic warping. The residual moveout curves or surfaces may be used to flatten common image gathers or derive velocity models. The method may be executed by a computer system.

14 Claims, 3 Drawing Sheets

SYSTEM AND METHOD FOR COMPUTING RESIDUAL MOVEOUT FROM SEISMIC IMAGES

TECHNICAL FIELD

The disclosed embodiments relate generally to techniques for computing residual moveout from geophysical seismic images of the subsurface and, in particular, to a method of computing residual moveout using dynamic imaging warping.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. However, seismic imaging generally also requires an accurate velocity model to be derived from the seismic data. Conventional methods for building velocity models include moveout analysis such as semblance analysis, tomography, and full waveform inversion. In general, conventional moveout analysis methods are based on 1D picking (analysis at individual x-y surface locations) and can result in lateral inconsistencies in the velocity model. Full waveform inversion can provide velocity models with better lateral consistency but are very computationally expensive.

There exists a need for improved diagnostic characterization of errors in imaging velocity as input to velocity analysis methods that are not computationally expensive that will allow better velocity models to be derived, ultimately leading to seismic images that will allow better seismic interpretation of potential hydrocarbon reservoirs.

SUMMARY

In accordance with some embodiments, a method of computing residual moveout is disclosed including receiving a seismic image representative of a subsurface volume of interest; filtering the seismic image to remove noise to produce a filtered image; smoothing the filtered image to produce a smoothed image; bandpass-filtering the smoothed image to produce bandlimited CDP image gathers; sorting the bandlimited CDP image gathers into a plurality of common-offset volumes; performing dynamic image warping between adjacent ones of the plurality of common-offset volumes to produce a plurality of depth-shift volumes; sorting the plurality of depth-shift volumes into a plurality of depth-shift common-image-point (CDP) gathers; filtering the plurality of depth-shift CDP gathers along all dimensions to produce a plurality of noise-reduced depth-shift CDP gathers; selecting a sparse set of picks from the bandlimited CDP image gathers; and deriving a residual moveout curve or surface based on the sparse set of picks and the noise-reduced depth-shift CDP gathers. The method may further include using the residual moveout curve or surface to flatten CDP gathers or to derive a velocity model of the subsurface volume of interest. The method may be used iteratively. The derived velocity model and/or resultant seismic image may be used to identify potential hydrocarbon reservoirs.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of velocity analysis. These embodiments are designed to be of particular use for velocity analysis of subsurface volumes suspected to contain hydrocarbon reservoirs.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic imaging generally requires a fairly accurate velocity model of the subsurface to simulate seismic wave propagation. A velocity model is often built iteratively. The imaging is first done with an initial velocity model to produce initial images with various subsurface reflection angles or surface source-receive offsets. If the velocity is incorrect, the images at various offsets or angles will be inconsistent in depth. This means that the seismic events corresponding to subsurface reflectors (e.g., rock boundaries) in the common-image-point (CIP) gathers (often used interchangeably with common-depth-point CDP gathers) will exhibit residual moveout. The residual moveout (RMO) in depth as an indication of velocity errors can be picked (i.e., identified at different offsets/angles for each seismic event of interest) and used in a tomographic inversion to produce an improved velocity model which can then be used to create an improved image and further improve the velocity model iteratively. The present invention provides embodiments for identifying seismic data that does include such signal, deriving an improved velocity model that incorporates lateral consistency, and using it to construct a seismic image.

Figure 1:
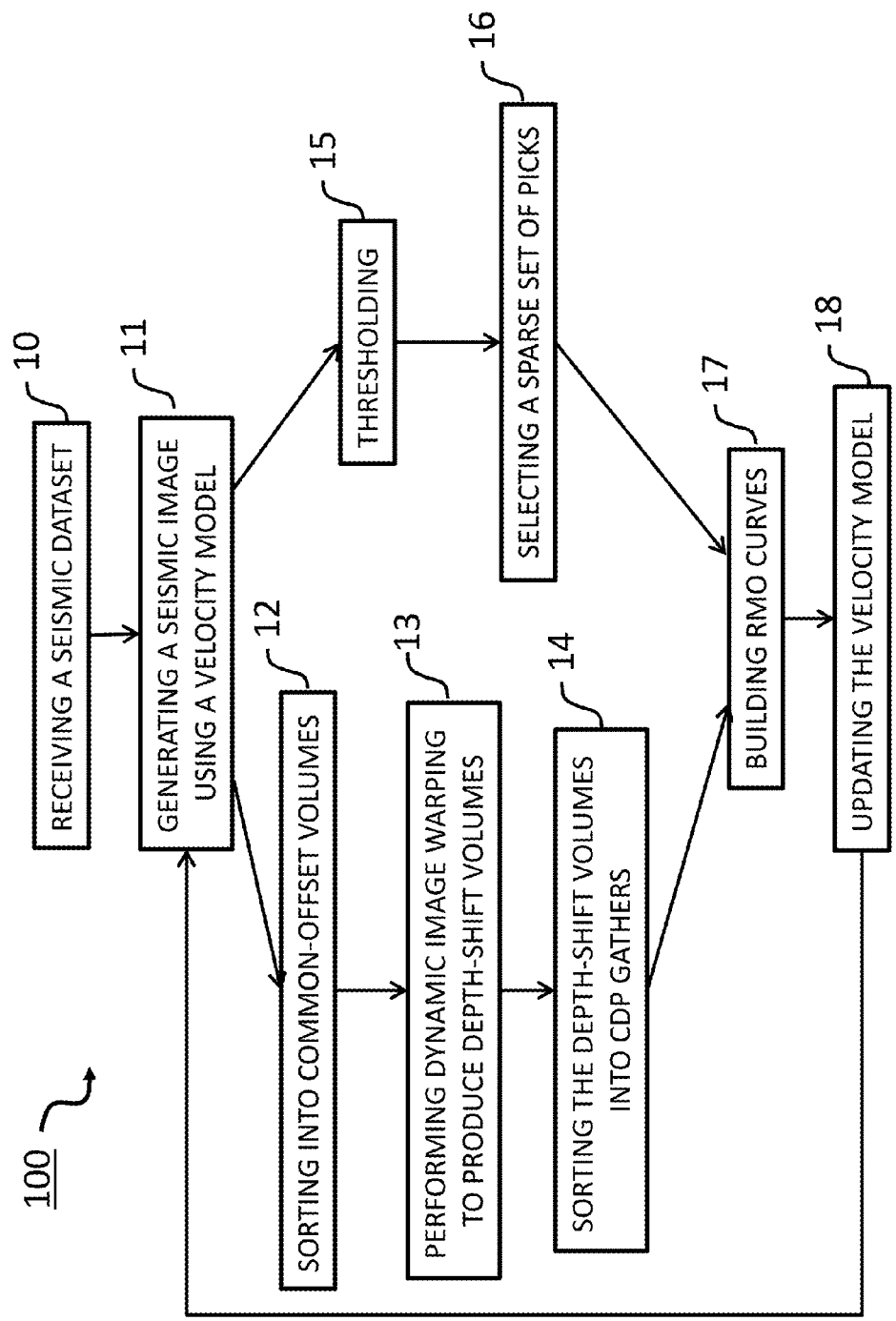
FIG. 1 illustrates a flowchart of a method of velocity analysis, in accordance with some embodiments.

FIG. 1 illustrates a flowchart of a method 100 for velocity analysis. At operation 10, a seismic dataset is received. This dataset may have been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data.

At operation 11, a prestack seismic image can be generated from the seismic dataset and a velocity model. The initial velocity model may be based on previous velocity analysis, such as semblance analysis. This seismic image may be further processed to prepare it for the next operations. In particular, it may be useful to remove coherent noise (e.g. multiple energy) using methods such as f-k filtering and to reduce incoherent noise by smoothing in the inline, crossline, and/or offset or angle dimensions. It may also be desirable to enhance a particular frequency band of the image by use of a bandpass filter.

At operation 12, the seismic image may be sorted from CIP (or CDP) gathers into common-offset volumes. The common-offset volumes may be representative of individual offsets or stacks of narrow offset ranges. In wide or full azimuth recording, the offset is a vector with x and y components. The common-offset volumes have a time or depth dimension and two lateral dimensions (x and y) representative of geographic locations. Although the term "offset" is used throughout this application, the seismic dataset may have an angle dimension in addition to or in place of an offset dimension; the angle dimension is within the scope of this invention and could be used in place of the offset dimension. Examples of angles include recording azimuth and reflection angle. The vector offsets can be gridded such as a rectangular x-y grid or polar grid.

At operation 13, adjacent common-offset volumes are input to a dynamic image warping algorithm such as that of Hale (2013). Dynamic image warping estimates time and/or depth shifts between two seismic images; in the case of the present invention, the depth shifts are between the adjacent common-offset volumes. The dynamic image warping used in the present invention constrains the depth shifts laterally and vertically, thereby enforcing consistency. The dynamic image warping uses two input volumes to produce one depth-shift volume. This means that if there are N common-offset volumes, such as along a grid line with N offset grid points in one vector offset domain, there will be at most N–1 depth-shift volumes. The dimensions of the depth-shift volumes will be the same as those of the common-offset volumes but the data contained in the depth-shift volume will be the calculated shift between events in the adjacent common-offset volumes.

The depth-shift volumes are sorted at operation 14 into common-depth-point (CDP) gathers. The depth-shift CDP gathers have an offset or angle dimension, or two dimensions in the case of vector offsets. It may be desirable to filter the depth-shift CDP gathers along all dimensions to remove erroneous outliers and random noise.

Method 100 also performs further processing of the seismic image from operation 11. This seismic image may have been filtered and/or smoothed to reduce noise. It may be rotated in phase. It may be subjected to a thresholding operation 15. For example, all negative amplitudes in the image may be set to zero. The threshold might be set to zero out all amplitudes beneath a small positive amplitude. Alternatively, the threshold might be set to zero out the positive amplitudes and maintain the negative amplitudes. Each event is identified as a cluster of image grid points with non-zero amplitudes after thresholding. The events are separated by zero amplitudes. The goal of the thresholding operation 15 is to create disjointed seismic events that can easily be focused on during the next operation.

Picking operation 16 is designed to identify a sparse set of "picks" from the seismic image. If the thresholding operation 15 maintained the positive amplitudes, picking operation 16 will identify the peak amplitude in each of the disjointed seismic events. If the thresholding operation 15 maintained the negative amplitudes, picking operation 16 will identify the lowest amplitude in each of the disjointed seismic events. Each disjointed seismic event has a pick made at a single offset at each x and/or y location included in the event.

Figure 2:
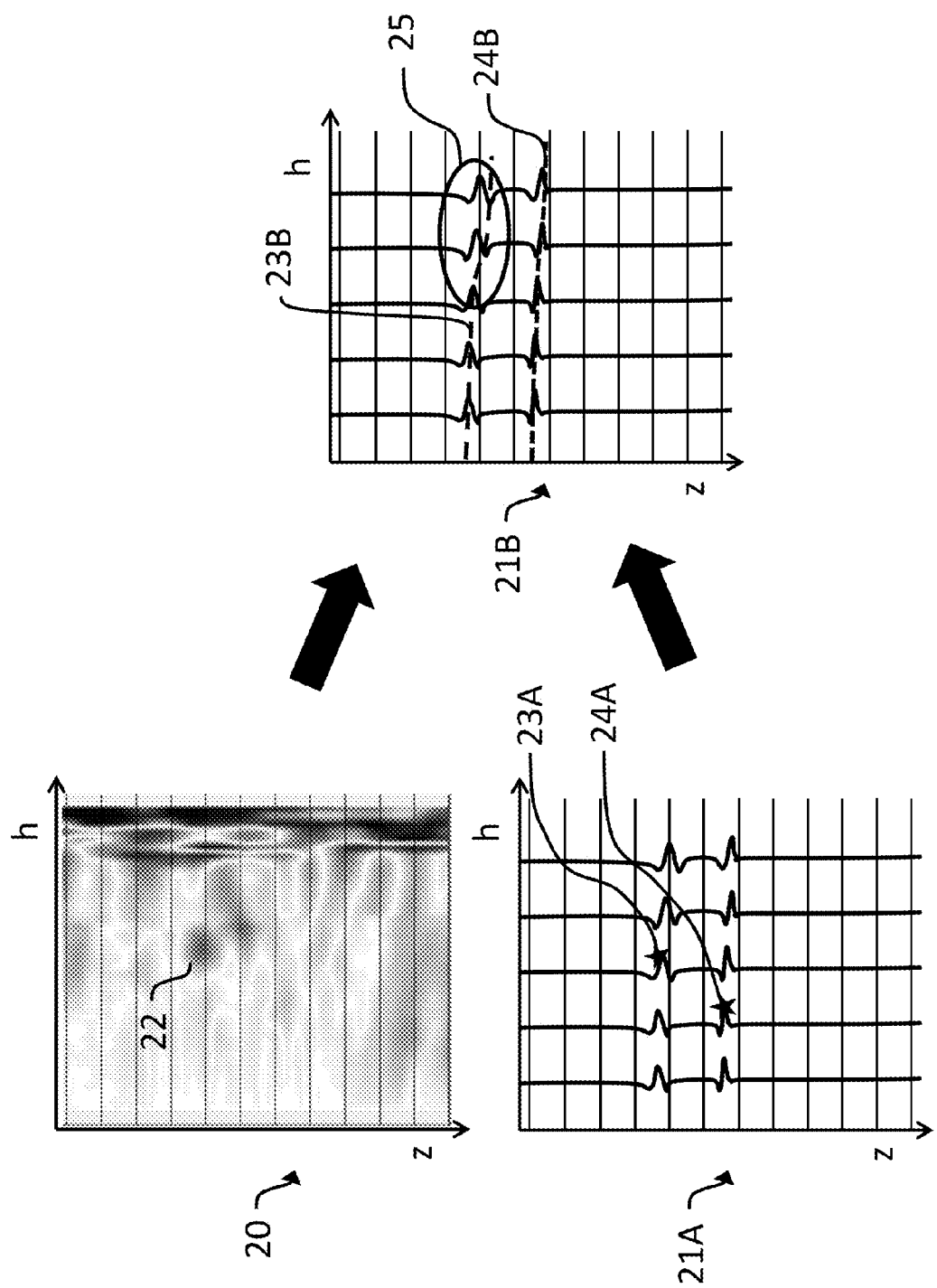
FIG. 2 is a diagram demonstrating a step of an embodiment.

The sparse picks from picking operation 16 and the depth-shift CDP gathers from operation 14 are used to build the RMO curves along each offset direction in operation 17. This is demonstrated in FIG. 2. FIG. 2 includes depth-shift CDP gather 20 and seismic CDP gathers 21A and 21B. Seismic CDP gathers 21A and 21B show the same traces along the offset (h) direction. Seismic CDP gather 21A shows the sparse picks 23A and 24A made for the two different seismic events. Each pick is used as a starting point along the offset dimension. The corresponding depth-shift CDP gather 20 is used to determine the depth stride to the next offset. The use of the depth-shift CDP gathers which have been generated through the use of dynamic image warping constrains the depth stride to behave consistently along the lateral x or y dimension. This lateral consistency is superior to conventional methods which only trace the RMO curve in offset at a single x or y location and therefore may be unduly influenced by noise or other errors in a particular CDP gather. In FIG. 2, the depth-shift CDP gather 20 shows a large shift anomaly 22. RMO curves are built for all seismic events of interest at all CDP locations of interest during operation 17. In FIG. 2, the sparse picks 23A and 24A are the starting points for RMO curves that extend to smaller and larger offsets based on the shifts in the depth-shift CDP gather 20. These RMO curves are shown as dashed line 23B and dotted line 24B in seismic CDP gather 21B. Note that in region 25, the RMO curve 23B is deeper (lower) than the peaks of the seismic data. This is due to the large shift anomaly 22. Conventional RMO curves would follow the peaks of the seismic data which would result in discontinuous behavior in the lateral direction (not shown in FIG. 2) when the CDP gather is polluted by noise, migration artifacts, and/or AVO effects, including the abrupt phase change associated with critical reflections. For wide azimuth data and images with vector offset, the RMO curves can be used to define the RMO surfaces.

The RMO curves or surfaces from operation 17 are used to update the velocity model at operation 18. This velocity model update may be performed using tomographic inversion. One such approach is raytracing tomography. For each subsurface image point (x,y,z) with an RMO curve (z versus offset), a pair of rays are traced from the image point to the surface. The two rays correspond to the source and receiver locations that would be a specular reflection at the image point consistent with the image dip. If the velocity model is correct, the images of a single subsurface point in the earth should be imaged at the same depth by energies recorded at various offsets. The RMO curve measures the differences (i.e., inconsistencies) in the image depth versus offset of the single subsurface point. If the velocity model is changed, both the ray paths, traveltimes along ray paths change, and imaging depth of the corresponding the ray paths change, thus altering the RMO curve. Tomography seeks to change the velocity model in such a way that RMO curve is as flat as possible versus offset.

The updated velocity model can be used to generate a new seismic image. If the updated velocity model is more accurate than the initial velocity model, the new seismic image will have less residual moveout along the offset dimension. If there is still RMO, particularly in volumes of interest in the subsurface, method 100 may be repeated, looping through operations 11-18 until the RMO is sufficiently reduced. In additional to quantitative measures of the RMO to diagnose imaging velocity errors, wrong velocity also causes mis-ties between seismic data and well data, poor focusing, and amplitude distortions. Empirical stopping criteria for the iterative method include visual or qualitative measures to determine imaging suitability for structural interpretation and amplitude-versus-offset (AVO) analysis.

Figure 3:
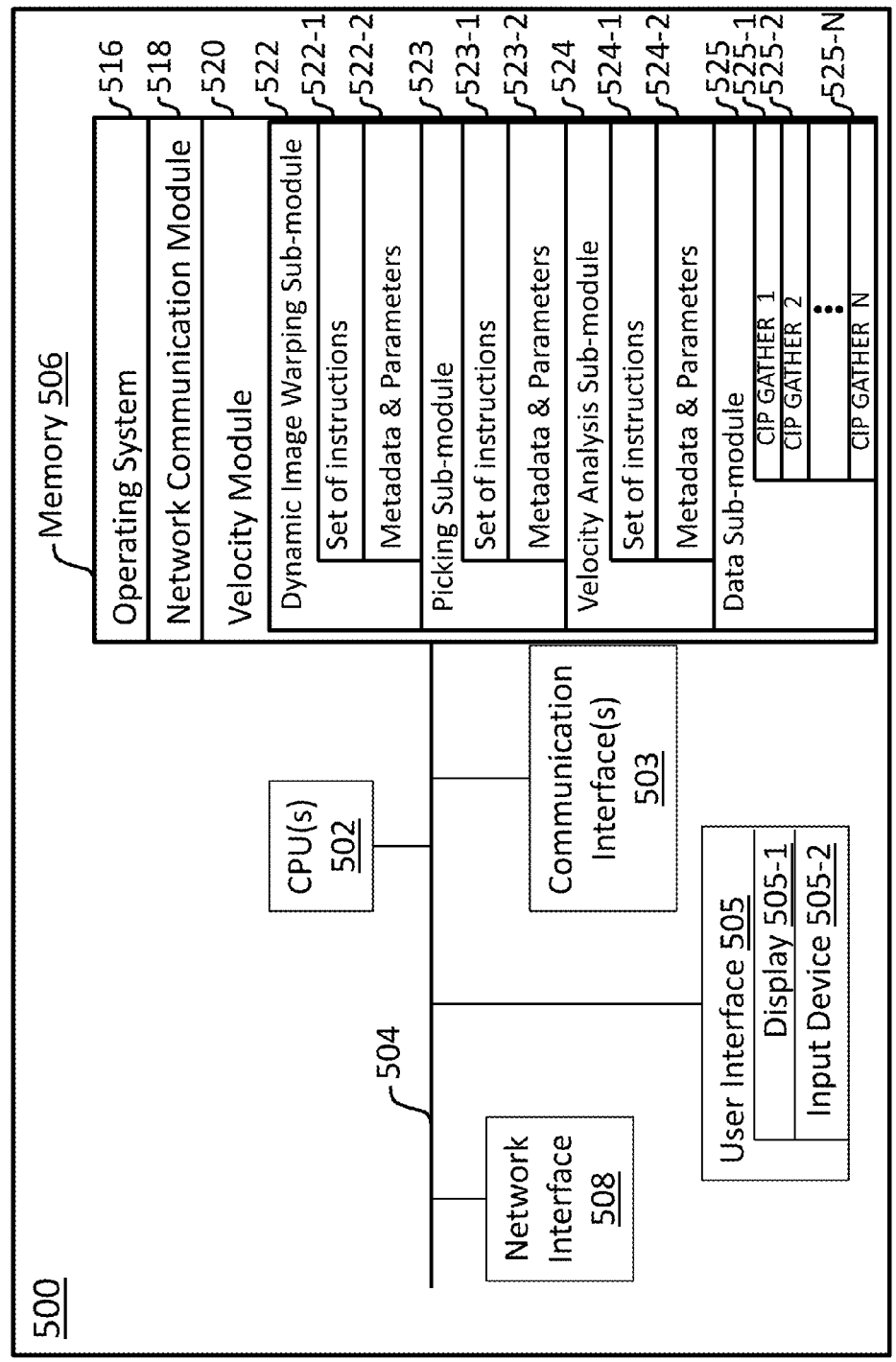
FIG. 3 is a block diagram illustrating a velocity analysis system, in accordance with some embodiments.

FIG. 3 is a block diagram illustrating a velocity analysis system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the velocity analysis system 500 includes one or more processing units (CPUs) 502, one or more network interfaces 508 and/or other communications interfaces 503, memory 506, and one or more communication buses 504 for interconnecting these and various other components. The velocity analysis system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a velocity module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the velocity module 520 executes the operations of method 100. Velocity module 520 may include data sub-module 525, which handles the seismic dataset including common-image-point (CIP) gathers 525-1 through 525-N. This seismic data is supplied by data sub-module 525 to other sub-modules. The data sub-module 525 may include functionality such as various filtering, smoothing, and sorting operations. These examples are not meant to be limiting. In addition, data sub-module 525 may contain both seismic data and seismic images and may include imaging algorithms to produce seismic images from seismic data.

Dynamic image warping sub-module 522 contains a set of instructions 522-1 and accepts metadata and parameters 522-2 that will enable it to execute operations 12-14 of method 100. Dynamic image warping sub-module 522 will produce depth shifts from CDP gathers and will depth-shift CDP gathers. Picking sub-module 523 contains a set of instructions 523-1 and accepts metadata and parameters 532-2 that will enable it to execute, for example, operations 15-16 of method 100. The velocity analysis sub-module 524 contains a set of instructions 524-1 and accepts metadata and parameters 524-2 that will enable it to execute operations 17-18 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data, updating the velocity model, and generating the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 3) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for deriving residual moveout curves or surfaces, comprising:

a. receiving a seismic image representative of a subsurface volume of interest;
    b. filtering the seismic image, via a computer processor, to remove noise to produce a filtered image;
    c. smoothing the filtered image, via the computer processor, to produce a smoothed image;
    d. bandpass-filtering the smoothed image, via the computer processor, to produce bandlimited CDP image gathers;
    e. sorting the bandlimited CDP image gathers into a plurality of common-offset volumes;
    f. performing dynamic image warping between adjacent ones of the plurality of common-offset volumes to produce a plurality of depth-shift volumes;
    g. sorting the plurality of depth-shift volumes into a plurality of depth-shift common-image-point (CDP) gathers;
    h. filtering the plurality of depth-shift CDP gathers along all dimensions to produce a plurality of noise-reduced depth-shift CDP gathers;
    i. selecting a sparse set of picks from the bandlimited CDP image gathers; and
    j. deriving a residual moveout curve or surface-based on the sparse set of picks and the noise-reduced depth-shift CDP gathers.

2. The method of claim 1 further comprising using the residual moveout curve or surface to flatten CDP gathers of the seismic images.

3. The method of claim 1 wherein the selecting the sparse set of picks includes applying a threshold criterion to amplitudes in the bandlimited dataset to produce disjointed seismic events and identifying a peak amplitude location for each disjointed seismic event.

4. The method of claim 1 further comprising using the residual moveout curve or surface to derive a velocity model of the subsurface volume of interest.

5. The method of claim 4 wherein the deriving the velocity model includes calculating residual moveout (RMO) curves by starting from each of the sparse set of picks and determining a depth stride between offsets based on the noise-reduced depth-shift CDP gathers.

6. The method of claim 4 further comprising using the velocity model to generate a new seismic image.

7. The method of claim 6 further comprising repeating steps b-j using the new seismic image as input.

8. The method of claim 6 further comprising using the new seismic image to identify potential hydrocarbon reservoirs.

9. A computer system, comprising:
    one or more processors;
    memory; and
    one or more programs, wherein the one or more programs are stored in the memory and configured to be executed by the one or more processors, the one or more programs including instructions that when executed by the one or more processors cause the device to:
    filter the seismic image to remove noise to produce a filtered image;
    smooth the filtered image to produce a smoothed image;
    bandpass-filter the smoothed image to produce bandlimited CDP image gathers;
    sort the bandlimited CDP image gathers into a plurality of common-offset volumes;
    perform dynamic image warping between adjacent ones of the plurality of common-offset volumes to produce a plurality of depth-shift volumes;

sort the plurality of depth-shift volumes into a plurality of depth-shift common-image-point (CDP) gathers; filter the plurality of depth-shift CDP gathers along all dimensions to produce a plurality of noise-reduced depth-shift CDP gathers; select a sparse set of picks from the bandlimited CDP image gathers; and derive a residual moveout curve or surface based on the sparse set of picks and the noise-reduced depth-shift CDP gathers.

10. The system of claim 9 wherein the instructions further cause the device to use the residual moveout curve or surface to flatten CDP gathers.

11. The system of claim 9 wherein the instructions further cause the device to use the residual moveout curve or surface to derive a velocity model of the subsurface volume of interest.

12. A non-transitory computer readable storage medium storing one or more programs, the one or more programs comprising instructions, which when executed by an electronic device with one or more processors and memory, cause the device to:

filter the seismic image to remove noise to produce a filtered image;

smooth the filtered image to produce a smoothed image;

bandpass-filter the smoothed image to produce bandlimited CDP image gathers;

sort the bandlimited CDP image gathers into a plurality of common-offset volumes;

perform dynamic image warping between adjacent ones of the plurality of common-offset volumes to produce a plurality of depth-shift volumes;

sort the plurality of depth-shift volumes into a plurality of depth-shift common-image-point (CDP) gathers;

filter the plurality of depth-shift CDP gathers along all dimensions to produce plurality of noise-reduced depth-shift CDP gathers;

select a sparse set of picks from the bandlimited CDP image gathers; and derive a residual moveout curve or surface based on the sparse set of picks and the noise-reduced depth-shift CDP gathers.

13. The non-transitory computer readable storage medium of claim 12 wherein the instructions further cause the device to use the residual moveout curve or surface to flatten CDP gathers.

14. The non-transitory computer readable storage medium of claim 12 wherein the instructions further cause the device to use the residual moveout curve or surface to derive a velocity model of the subsurface volume of interest.

* * * * *